(12) United States Patent
Elliott

(10) Patent No.: US 9,689,441 B2
(45) Date of Patent: Jun. 27, 2017

(54) HORIZONTAL CAM STOP

(71) Applicant: Gencor Industries, Inc., Orlando, FL (US)

(72) Inventor: Marc G. Elliott, Longwood, FL (US)

(73) Assignee: GENCOR INDUSTRIES, INC., Orlando, FL (US)

(*) Notice: Subject to any disclaimer, the term of this patent is extended or adjusted under 35 U.S.C. 154(b) by 123 days.

(21) Appl. No.: 14/683,593

(22) Filed: Apr. 10, 2015

(65) Prior Publication Data

US 2016/0298701 A1    Oct. 13, 2016

(51) Int. Cl.
*F16D 41/061* (2006.01)
*F16D 41/07* (2006.01)
*F16D 41/069* (2006.01)
F16D 41/06 (2006.01)

(52) U.S. Cl.
CPC ............ *F16D 41/069* (2013.01); *F16D 41/07* (2013.01); *F16D 2041/0603* (2013.01)

(58) Field of Classification Search
CPC ........... F16D 41/069; F16D 2041/0601; F16D 2041/0603; F16D 41/076; F16D 41/073
See application file for complete search history.

(56) References Cited

U.S. PATENT DOCUMENTS

| 3,987,682 | A | * | 10/1976 | Roantree | .................. | B62M 9/08 |
| | | | | | | 74/117 |
| 4,516,334 | A | | 5/1985 | Wanke | | |
| 4,522,289 | A | * | 6/1985 | Giese | .................... | F16D 41/067 |
| | | | | | | 192/41 A |
| 4,656,759 | A | | 4/1987 | Yamato | | |
| 4,668,185 | A | | 5/1987 | Taylor | | |
| 4,770,236 | A | | 9/1988 | Kulikowski | | |
| 4,916,831 | A | | 4/1990 | Yasumura et al. | | |
| 4,964,226 | A | | 10/1990 | Gobel | | |
| 5,197,204 | A | | 3/1993 | Christensen | | |
| 5,305,533 | A | | 4/1994 | Alexander et al. | | |
| 5,518,094 | A | * | 5/1996 | Myrick | .................... | F16D 41/07 |
| | | | | | | 188/82.77 |
| 5,581,902 | A | | 12/1996 | Didion et al. | | |
| 5,746,006 | A | | 5/1998 | Duske et al. | | |
| 5,960,917 | A | * | 10/1999 | Still | ........................ | F16D 41/07 |
| | | | | | | 192/103 B |
| 5,996,245 | A | | 12/1999 | Yamato | | |
| 6,052,917 | A | | 4/2000 | Matsumoto | | |
| 6,446,775 | B2 | * | 9/2002 | Nagaya | .................... | F16D 41/07 |
| | | | | | | 192/41 A |
| 6,640,949 | B1 | * | 11/2003 | Vranish | .................... | F16D 41/07 |
| | | | | | | 192/110 B |
| 8,601,711 | B2 | | 12/2013 | Kim | | |

(Continued)

*Primary Examiner* — Mark Manley
(74) *Attorney, Agent, or Firm* — Nixon & Vanderhye P.C.

(57) ABSTRACT

A cam stop conducts rotation from a driving part, such as a tire ring, to a driven part, such as a rotary dryer or kiln. The cam stop includes a pair of support blocks securable to the driven part, and a cam rod rotatably coupled with the support blocks and extending between the support blocks. The cam rod includes a logarithmic spiral cam profile, and the cam rod is displaceable in a radial direction into engagement with the driving part by rotation according to the logarithmic spiral cam profile. Rotation of the tire ring may be conducted to the rotary drum by frictional engagement between the cam rod and the driving part.

14 Claims, 3 Drawing Sheets

(56) References Cited

U.S. PATENT DOCUMENTS

2006/0076205 A1\* 4/2006 Muramatsu ............ F16D 41/07
192/45.1
2007/0200962 A1\* 8/2007 Choi .................... F16D 41/069
348/794

\* cited by examiner

HORIZONTAL CAM STOP

CROSS-REFERENCES TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

The invention relates generally to conducting rotation from a driving part to a driven part and, more particularly, to a horizontal cam stop that conducts rotational movement between a rotary dryer or kiln and a ride ring or tire ring.

A rotary dryer/kiln is a type of industrial dryer that is used to reduce the moisture content in various materials. They are often used in the processing of cement, iron ore, limestone, plus many materials. Typical rotary dryers/kilns include a cylindrical shell that is inclined slightly in the horizontal and supported by a set of ride rings that rest upon rollers. The contents of the dryer are heated, while the dryer is slowly rotated about its axis by rotational motion applied to the system through one of many different methods.

In one configuration, a force is applied to a tire ring through power applied to the rollers. The tire rings should be linked to the dryer in the radial direction and in the circumferential direction.

BRIEF SUMMARY OF THE INVENTION

The horizontal cam stop of the described embodiments meets this need and serves to conduct rotation from the tire ring to the dryer, in the direction of rotation, without detrimentally impacting the radial suspension. It utilizes a horizontal cam-shaped rod with a logarithmic cam profile to secure the tire ring to the drum without direct attachment, only frictional force. The horizontal cam stop conducts rotational force in the desired direction, while having the ability to release and allow free counter-rotation when needed.

In an exemplary embodiment, a cam stop conducts rotation from a driving part to a driven part. The cam stop includes a pair of support blocks securable to the driven part, and a cam rod rotatably coupled with the support blocks and extending between the support blocks. The cam rod includes a logarithmic spiral cam profile, and the cam rod is displaceable in a radial direction into engagement with the driving part by rotation according to the logarithmic spiral cam profile.

The cam stop may further include a support plate, where the support plate may be securable directly to the driven part, and the support blocks may be secured to the support plate. Each of the support blocks may include a rotation slot machined therein, where ends of the cam rod may be positioned and shaped for rotation in the slots of the support blocks. The cam stop may still further include a spring support plate secured between the support blocks parallel to and spaced from the cam rod, and at least one spring, preferably two, interposed between the spring support plate and the cam rod. The spring urges the cam rod radially outward. An exterior surface of the cam rod may be roughened. The cam rod may be configured to frictionally engage the driving part upon rotation of the driving part in a first direction. In this context, the frictional engagement between the cam rod and the driving part may be released upon rotation of the driving part in a second direction opposite from the first direction.

In another exemplary embodiment, a rotary drum assembly includes a rotary drum, a tire ring disposed surrounding the rotary drum, and the cam stop of the described embodiments disposed between the tire ring and the rotary drum. The cam stop conducts rotation from the tire ring to the rotary drum.

In still another exemplary embodiment, a cam stop for conducting rotation from a tire ring to a rotary drum includes a support plate fixable to the rotary drum, a pair of support blocks secured to the support plate, and a cam rod rotatably coupled with the support blocks and extending in an axial direction between the support blocks. The cam rod includes a logarithmic spiral cam profile, and the cam rod is displaceable in a radial direction into engagement with the tire ring by rotation according to the logarithmic spiral cam profile. Rotation of the tire ring is conducted to the rotary drum by frictional engagement between the cam rod and the tire ring.

BRIEF DESCRIPTION OF THE DRAWINGS

These and other aspects and advantages will be described in detail with reference to the accompanying drawings, in which.

DETAILED DESCRIPTION OF THE INVENTION

With reference to the drawings, a cam stop conducts rotation from a driving part to a driven part. The cam stop includes a pair of support blocks 12 securable to the driven part. A cam rod 14 is rotatably coupled with the support blocks 12 and extends between the support blocks 12. The cam stop may also include a support plate 16 that may be secured directly to the driven part, with the support blocks 12 secured to the support plate 16. The support blocks 16 may be attached to the driven part in two or more locations.

Figure 1:
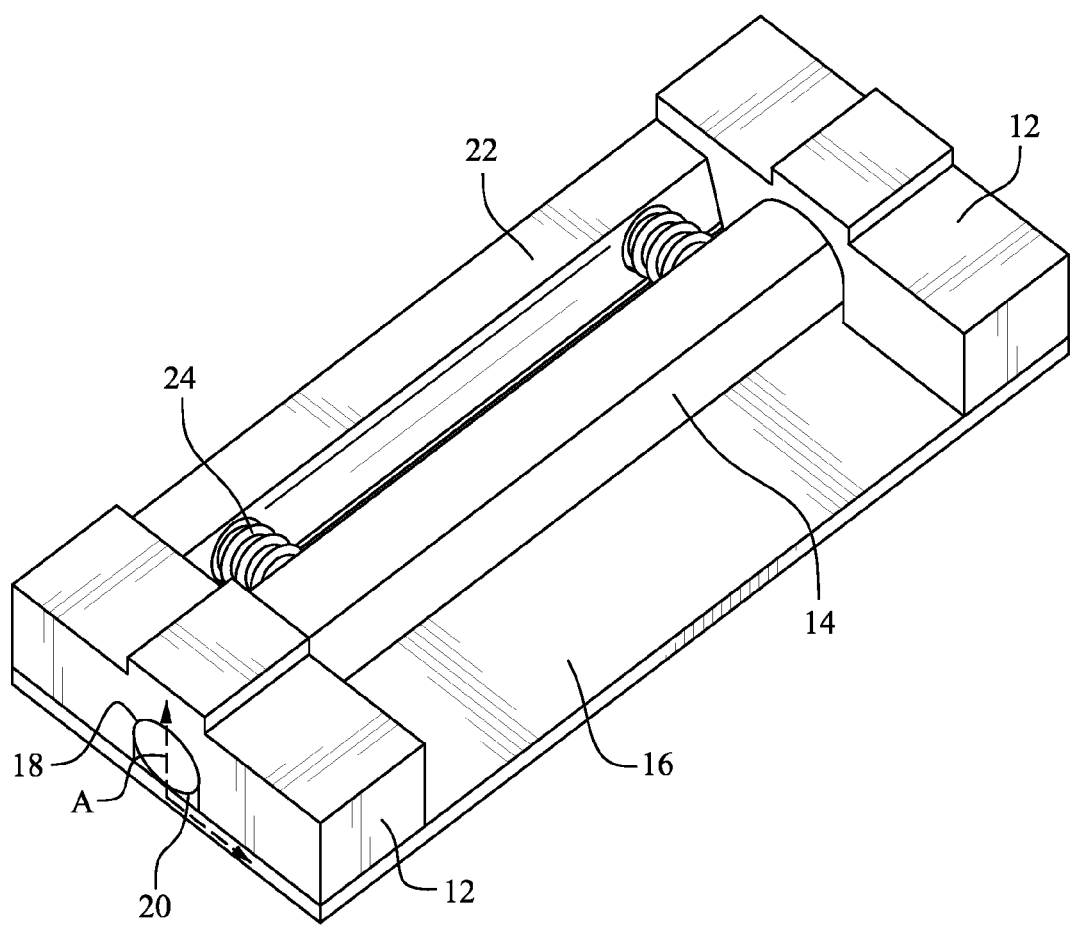
FIG. 1 is a perspective view of the cam stop of the described embodiments.

Each of the support blocks 12 includes a rotation slot 18 machined therein, and ends 20 of the cam rod 14 are positioned and shaped for rotation in the slots 18 of the support blocks 12. The cam rod 14 is preferably provided with a logarithmic spiral cam profile. The cam rod 14 is displaceable in a radial direction (direction A in FIG. 1) into engagement with the driving part by rotation according to the logarithmic spiral cam profile or can rotate in an opposite radial direction if the rotation of the driving part reverses. A roughening process such as linear knurling or the like may be applied to the functional section of the cam rod 14 to add additional frictional surface.

The cam stop may additionally include a spring support plate 22 secured between the support blocks 12 generally parallel to and spaced from the cam rod 14. At least one spring 24, preferably two, may be interposed between the spring support plate 22 and the cam rod 14. The spring 24 acts on the cam rod 14 to urge the cam surface in a radially outward direction. That is, the spring 24 pushes against the spring support plate 22 to ensure additional force to the cam rod 14 to engage the driving part.

Figure 2:
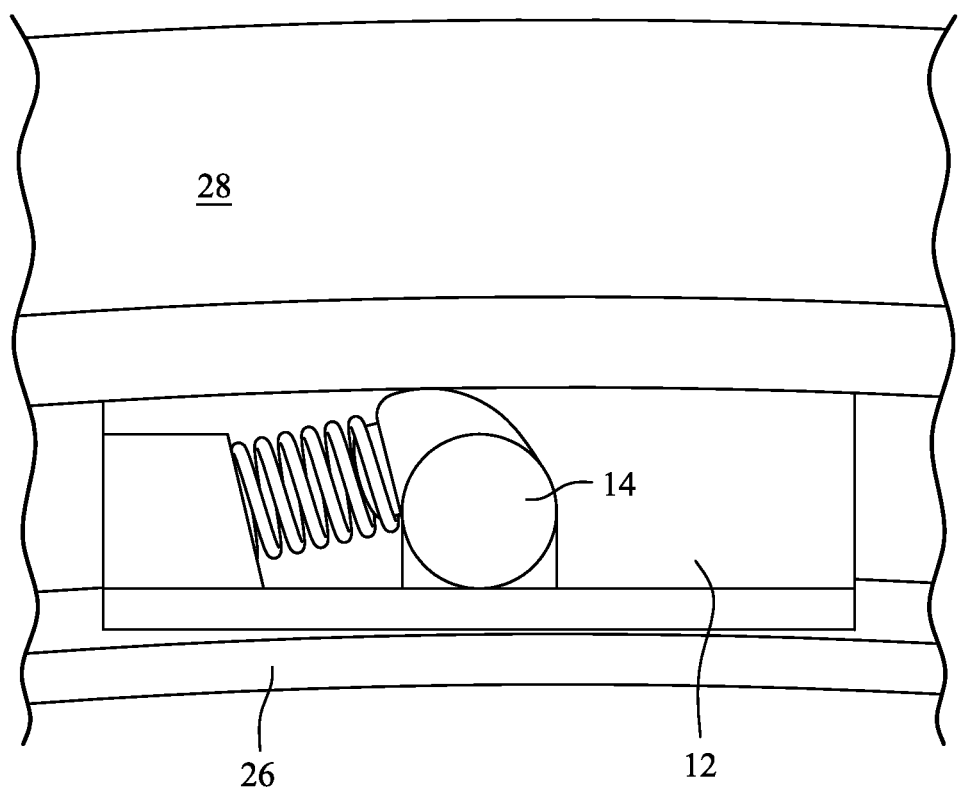
FIG. 2 is a side view of the cam stop installed between a driven part such as a rotary dryer or kiln and a driving part such as a tire ring.
Figure 3:
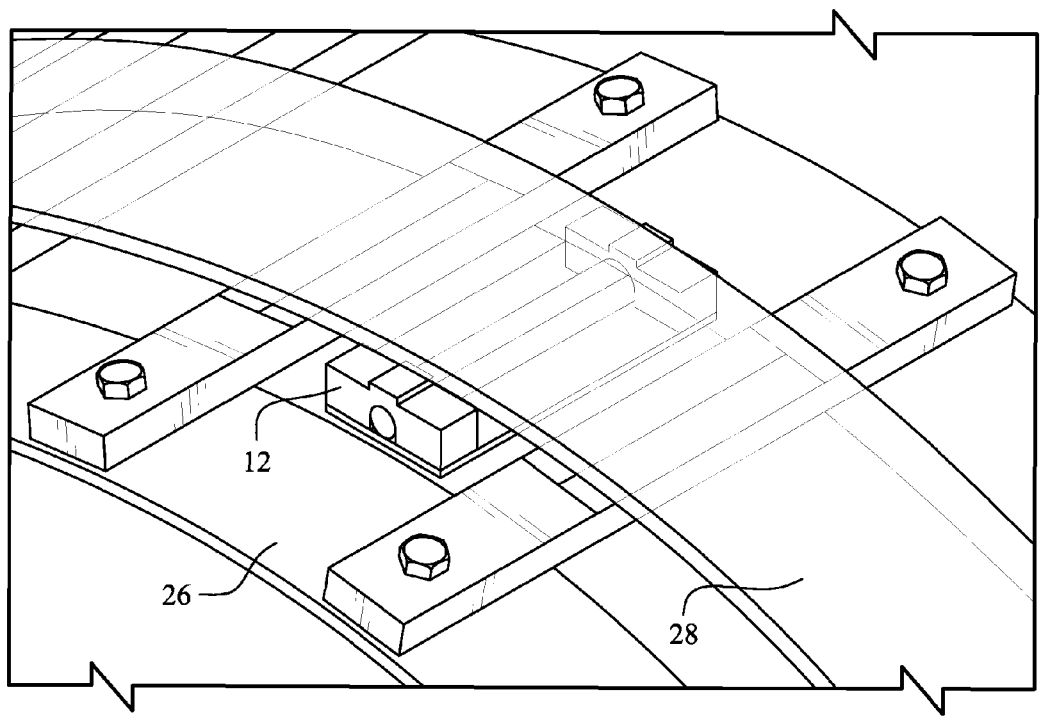
FIG. 3 is a perspective view showing the horizontal cam stop in use.

An exemplary application of the cam stop will be described with reference to FIGS. 2 and 3 in the context of a rotary dryer or kiln 26 that is driven by a tire ring 28. A rotational force will be applied to the tire ring 28 in a direction perpendicular to the assembly, and contact between an inner diameter of the tire ring 28 and the horizontal surface of the cam rod 14 will secure the tire ring 28 using frictional force. The horizontal cam rod 14 is designed to provide sufficient frictional force by utilizing a calculated angle of contact. The cam angle for this design is determined using an equation for frictional force and calculations determined by a free body diagram for this system. To guarantee that the desired cam angle is always met, the cam profile follows the logarithmic spiral. The point of rotation is placed at the center of the logarithmic spiral, so that as the horizontal cam rod 14 rotates, the horizontal cam face follows the logarithmic curvature. The horizontal cam rod 14 will always contact the tire ring 28 tangent surface at the same angle, regardless of radial distance (within the designed range of the assembly). In other words, the radial distance (or height) between the cam rod center and the tire ring 28 can be adjusted, and the results will not be affected. The profile of the horizontal cam apparatus will allow for assembly/manufacturing deviations and still provide the same desired holding force.

The device secures the rotary drum 26 to its tire ring 28 in the direction of rotation. The assembly is attached to the drum, and when a force is applied to the tire ring 28, the assembly holds the tire ring 28, pulling the drum 26 around with it. The device will release the tire ring 28 and allow it to "slip," relative to the drum 26, if counter-rotational motion occurs. That is, the device will release and allow slippage if rotation is stopped so that the rotary drum 26 can come to a slow and dampened stop, rather than an abrupt stop, thereby reducing the possibility for added stress and damage.

In a preferred construction, the contact parts comprise steel pressed against steel with no welding or other direct attachment required. Friction between the objects will hold the tire ring 28 with a force proportional to the rotational force on the tire ring 28.

The cam stop may be installed on existing dryers or new, and one or more devices can be added as required per application. The device may be used on clockwise and counterclockwise rotating dryers. The installation direction is dependent on the drum rotation direction. The low-profile design reduces interference with auxiliary equipment.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A cam stop for conducting rotation from a driving part to a driven part, the cam stop comprising:
   a pair of support blocks securable to the driven part outside of opposite lateral sides of the driving part; and
   a cam rod rotatably coupled with the support blocks and extending between the support blocks across an entire width of the driving part, wherein the cam rod includes a logarithmic spiral cam profile, wherein the cam rod is displaceable in a radial direction into engagement with the driving part by rotation according to the logarithmic spiral cam profile, and wherein the cam rod is rotatable within the support blocks to a limited extent and fixedly mountable by the support blocks to the driven part for rotation with the driven part.

2. A cam stop according to claim 1, further comprising a support plate, wherein the support plate is securable directly to the driven part, and wherein the support blocks are secured to the support plate.

3. A cam stop according to claim 1, wherein each of the support blocks comprises a rotation slot machined therein, and wherein ends of the cam rod are positioned and shaped for rotation in the slots of the support blocks.

4. A cam stop according to claim 1, further comprising:
   a spring support plate secured between the support blocks parallel to and spaced from the cam rod; and
   at least one spring interposed between the spring support plate and the cam rod, the spring urging the cam rod radially outward.

5. A cam stop according to claim 1, wherein an exterior surface of the cam rod is roughened.

6. A cam stop according to claim 1, wherein the cam rod is configured to frictionally engage the driving part upon rotation of the driving part in a first direction.

7. A cam stop according to claim 6, wherein the frictional engagement between the cam rod and the driving part is released upon rotation of the driving part in a second direction opposite from the first direction.

8. A rotary drum assembly comprising:
   a rotary drum;
   a tire ring disposed surrounding the rotary drum; and
   a cam stop disposed between the tire ring and the rotary drum, the cam stop conducting rotation from the tire ring to the rotary drum and including:
      a pair of support blocks secured to the rotary drum outside of opposite lateral sides of the tire ring, and
      a cam rod rotatably coupled with the support blocks and extending between the support blocks across an entire width of the tire ring, wherein the cam rod includes a logarithmic spiral cam profile, wherein the cam rod is displaceable in a radial direction into engagement with the tire ring by rotation according to the logarithmic spiral cam profile, and wherein the cam rod is rotatable within the support blocks to a limited extent and fixedly mounted by the support blocks to the rotary drum for rotation with the rotary drum.

9. A rotary drum assembly according to claim 8, further comprising a support plate secured directly to the rotary drum, and wherein the support blocks are secured to the support plate.

10. A rotary drum according to claim 8, wherein each of the support blocks comprises a rotation slot machined therein, and wherein ends of the cam rod are positioned and shaped for rotation in the slots of the support blocks.

11. A rotary drum according to claim 8, wherein the cam stop further comprises:
    a spring support plate secured between the support blocks parallel to and spaced from the cam rod; and
    at least one spring interposed between the spring support plate and the cam rod, the spring urging the cam rod radially outward.

12. A rotary drum according to claim 8, wherein an exterior surface of the cam rod is roughened.

13. A rotary drum according to claim 8, wherein the cam rod is configured to frictionally engage the tire ring upon rotation of the tire ring in a first direction.

14. A rotary drum according to claim 13, wherein the frictional engagement between the cam rod and the tire ring is released upon rotation of the tire ring in a second direction opposite from the first direction.

\* \* \* \* \*